US012447741B2

(12) United States Patent
Kawano et al.

(10) Patent No.: US 12,447,741 B2
(45) Date of Patent: Oct. 21, 2025

(54) LIQUID EJECTION APPARATUS AND DETERMINATION METHOD CAPABLE OF DETERMINING WHETHER OR NOT LIQUID FILLING OF PRESSURE CHAMBER HAS BEEN COMPLETED

(71) Applicant: KYOCERA Document Solutions Inc., Osaka (JP)

(72) Inventors: Daichi Kawano, Osaka (JP); Takashi Inoue, Osaka (JP); Keisuke Maeyama, Osaka (JP); Tatsuya Nakagawa, Osaka (JP); Satoshi Morimoto, Osaka (JP); Minori Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 195 days.

(21) Appl. No.: 18/455,566

(22) Filed: Aug. 24, 2023

(65) Prior Publication Data

US 2024/0109308 A1 Apr. 4, 2024

(30) Foreign Application Priority Data

Sep. 29, 2022 (JP) ................................ 2022-156452

(51) Int. Cl.
*B41J 2/045* (2006.01)
*B41J 2/175* (2006.01)

(52) U.S. Cl.
CPC ......... *B41J 2/04581* (2013.01); *B41J 2/0451* (2013.01); *B41J 2/17566* (2013.01); *B41J 2002/17583* (2013.01)

(58) Field of Classification Search
CPC .................................................... B41J 2/17566
See application file for complete search history.

(56) References Cited

U.S. PATENT DOCUMENTS

2005/0212836 A1* 9/2005 Nishihara ............ B41J 2/17566 347/7
2015/0062219 A1* 3/2015 Otokita ................ B41J 2/04581 347/10

FOREIGN PATENT DOCUMENTS

JP 2004299341 A 10/2004
JP 2005153152 A * 6/2005

OTHER PUBLICATIONS

Machine generated English translation of JP2005-153152A to Sakagami, “Liquid Filling Device and Method of Detecting/Judging Liquid Filling To Liquid Droplet Discharging Head”; retrieved via worldwide. espacenet.com on May 2, 2025; 15pp.*

* cited by examiner

*Primary Examiner* — Shelby L Fidler
(74) *Attorney, Agent, or Firm* — Alleman Hall & Tuttle LLP

(57) ABSTRACT

A liquid ejection apparatus includes a nozzle, a pressure chamber, a piezoelectric element, an output processing portion, and a determination processing portion. The nozzle ejects a liquid. The pressure chamber communicates with the nozzle and contains the liquid. The piezoelectric element changes a pressure in the pressure chamber in response to an input of a drive signal. The output processing portion causes the piezoelectric element to output a first electric signal corresponding to vibration generated in the pressure chamber in response to the input of the drive signal to the piezoelectric element. The determination processing portion determines whether or not the pressure chamber is in a filled state in which the pressure chamber is filled with the liquid, based on a frequency of the first electric signal output by the output processing portion.

1 Claim, 6 Drawing Sheets

LIQUID EJECTION APPARATUS AND DETERMINATION METHOD CAPABLE OF DETERMINING WHETHER OR NOT LIQUID FILLING OF PRESSURE CHAMBER HAS BEEN COMPLETED

INCORPORATION BY REFERENCE

This application is based upon and claims the benefit of priority from the corresponding Japanese Patent Application No. 2022-156452 filed on Sep. 29, 2022, the entire contents of which are incorporated herein by reference.

BACKGROUND

The present disclosure relates to a liquid ejection apparatus and a determination method.

A liquid ejection apparatus such as an ink jet printer that ejects a liquid such as ink is known. For example, the liquid ejection apparatus includes a nozzle, a pressure chamber, and a piezoelectric element. The nozzle ejects the liquid. The pressure chamber communicates with the nozzle and contains the liquid. The piezoelectric element changes a pressure in the pressure chamber in response to an input of a drive signal.

In addition, the liquid ejection apparatus that detects the viscosity of the liquid based on an electric signal output from the piezoelectric element, corresponding to vibration generated in the pressure chamber in response to the input of the drive signal to the piezoelectric element, is known.

SUMMARY

A liquid ejection apparatus according to one aspect of the present disclosure includes a nozzle, a pressure chamber, a piezoelectric element, an output processing portion, and a determination processing portion. The nozzle ejects a liquid. The pressure chamber communicates with the nozzle and contains the liquid. The piezoelectric element changes a pressure in the pressure chamber in response to an input of a drive signal. The output processing portion causes the piezoelectric element to output a first electric signal corresponding to vibration generated in the pressure chamber in response to the input of the drive signal to the piezoelectric element. The determination processing portion determines whether or not the pressure chamber is in a filled state in which the pressure chamber is filled with the liquid, based on a frequency of the first electric signal output by the output processing portion.

A determination method according to another aspect of the present disclosure is executed by a liquid ejection apparatus comprising: a nozzle configured to eject a liquid, a pressure chamber communicating with the nozzle and configured to contain the liquid; and a piezoelectric element configured to change a pressure in the pressure chamber in response to an input of a drive signal, and includes an output step and a determination step. In the output step, the piezoelectric element is caused to output a first electric signal corresponding to vibration generated in the pressure chamber in response to the input of the drive signal to the piezoelectric element. In the determination step, whether or not the pressure chamber is in a filled state in which the pressure chamber is filled with the liquid is determined based on a frequency of the first electric signal output by the output step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below with reference to the drawings. It is noted that the following embodiment is an example of embodying the present disclosure and does not limit the technical scope of the present disclosure.

[Configuration of Image Forming Apparatus 100]

Figure 1:
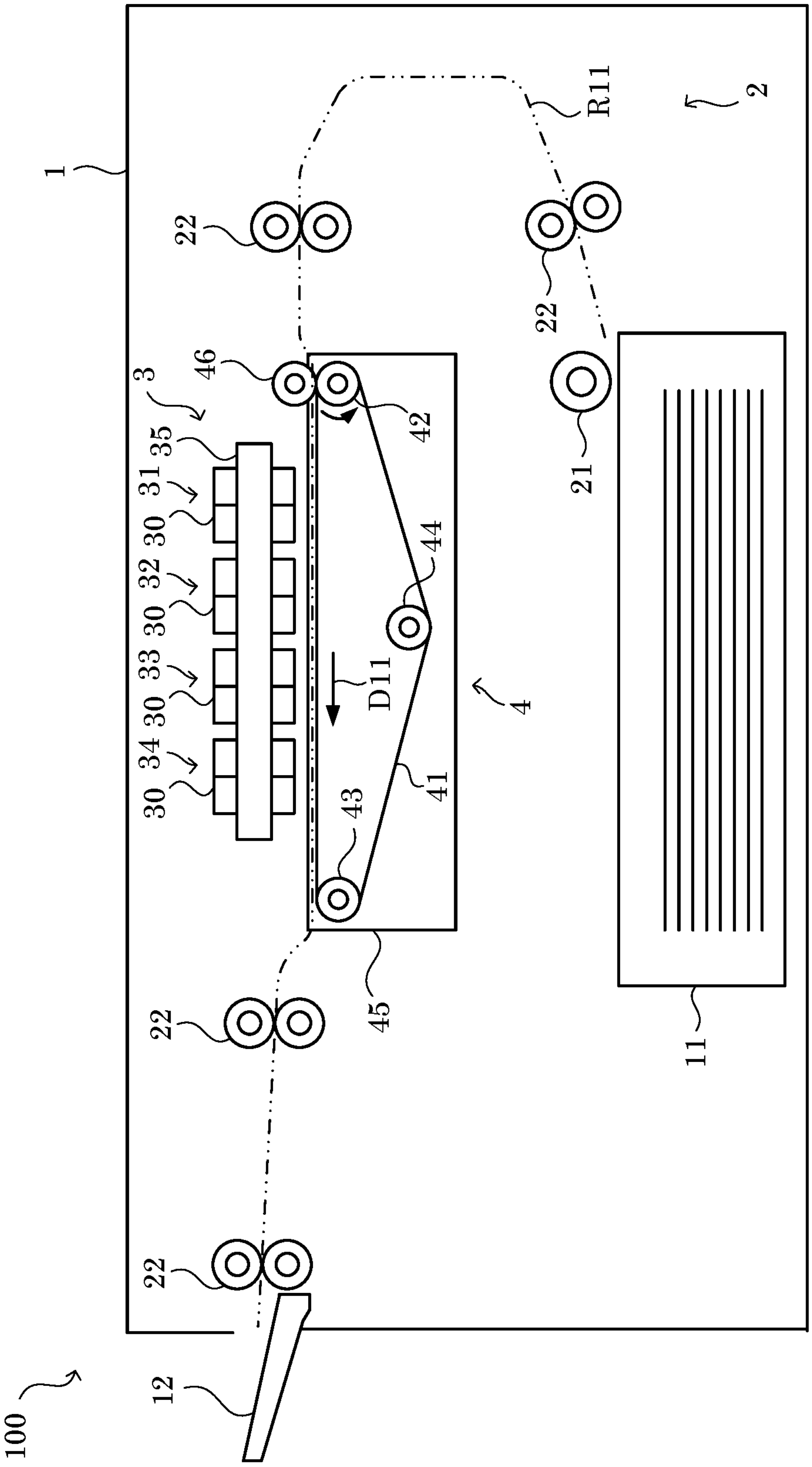
FIG. 1 is a diagram showing a configuration of an image forming apparatus according to an embodiment of the present disclosure.
Figure 2:
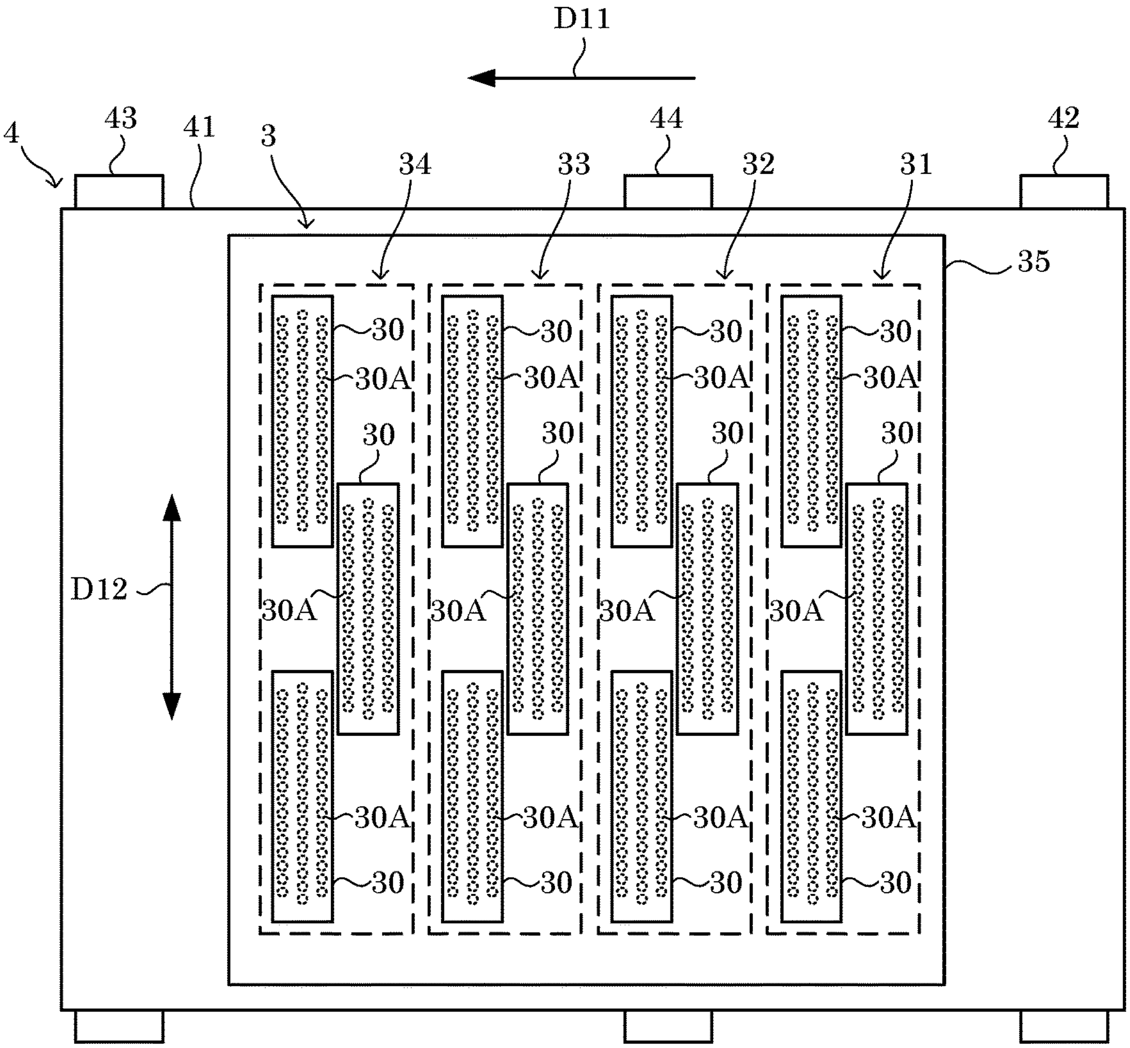
FIG. 2 is a diagram showing a configuration of an image forming portion and a conveying unit of the image forming apparatus according to the embodiment of the present disclosure.
Figure 3:
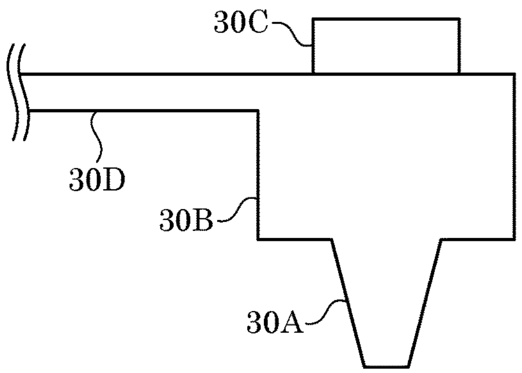
FIG. 3 is a diagram showing a configuration around nozzles of the image forming apparatus according to the embodiment of the present disclosure.

First, a configuration of an image forming apparatus 100 according to an embodiment of the present disclosure will be described with reference to FIG. 1 to FIG. 4. Here, FIG. 1 is a cross-sectional view showing a configuration of the image forming apparatus 100. In addition, FIG. 2 is a plan view showing configurations of an image forming portion 3 and a conveying unit 4. In addition, FIG. 3 is a cross-sectional view showing a configuration of a nozzle 30A, a pressure chamber 30B, a piezoelectric element 30C, and an individual flow path 30D. It is noted that a sheet conveying path R11 is indicated by a dash-dot-dot-dash line in FIG. 1.

The image forming apparatus 100 is a printer that can form an image on a sheet by an inkjet method. The image forming apparatus 100 is an example of the liquid ejection apparatus of the present disclosure. It is noted that the present disclosure may be applied to image forming apparatuses, such as a facsimile machine, a copier, and a multi-function peripheral, that can form an image on a sheet by an inkjet method.

As shown in FIG. 1 to FIG. 4, the image forming apparatus 100 includes a housing 1, a sheet conveying portion 2, an image forming portion 3, a conveying unit 4, an operation display portion 5, a storage portion 6, a first control portion 7, and a second control portion 8.

The housing 1 houses the constituent elements of the image forming apparatus 100. In the housing 1, a sheet feed cassette 11 (see FIG. 1) is detachably provided. The sheet feed cassette 11 contains sheets on which images are formed. A sheet discharge tray 12 (see FIG. 1) is provided on an outer surface of the housing 1. Sheets on which images have been formed by the image forming portion 3 are discharged to the sheet discharge tray 12. Inside the housing 1, the sheets contained in the sheet feed cassette 11 are conveyed along a sheet conveying path R11 (see FIG. 1) that leads to the sheet discharge tray 12 via an image forming position of the image forming portion 3.

The sheet conveying portion 2 conveys the sheets contained in the sheet feed cassette 11 along the sheet conveying path R11 (see FIG. 1). As shown in FIG. 1, the sheet conveying portion 2 includes a pickup roller 21 and a plurality of conveying rollers 22. The pickup roller 21 takes out the uppermost sheet in the sheet stack contained in the sheet feed cassette 11 and feeds the sheet to the sheet conveying path R11. The plurality of conveying rollers 22 are provided along the sheet conveying path R11. The conveying rollers 22 each convey the sheet along the sheet conveying path R11. The conveying rollers 22 each convey the sheet in a conveying direction D11 (see FIG. 1) from the sheet feed cassette 11 to the sheet discharge tray 12.

The image forming portion 3 forms, on the sheet, an image based on image data for image formation. As shown in FIG. 1, the image forming portion 3 includes line heads 31 to 34 and a head frame 35.

As shown in FIG. 2, each of the line heads 31 to 34 is long in a width direction D12 orthogonal to the conveying direction D11. Specifically, the line heads 31 to 34 each have a length in the width direction D12 corresponding to the width of the maximum size sheet among the sheets that can be contained in the sheet feed cassette 11. The line heads 31 to 34 are provided at regular intervals along the conveying direction D11.

As shown in FIG. 2, the line heads 31 to 34 each include a plurality of print heads 30. The print heads 30 each eject ink toward the sheet conveyed by the conveying unit 4. The print heads 30 provided in the line head 31 each eject black ink. The print heads 30 provided in the line head 32 each eject cyan ink. The print heads 30 provided in the line head 33 each eject magenta ink. The print heads 30 provided in the line head 34 each eject yellow ink.

The print heads 30 each include a plurality of nozzles 30A (see FIG. 2 and FIG. 3) that eject ink (an example of the liquid of the present disclosure). The nozzles 30A are provided on a surface of the corresponding print head 30 that faces the sheet conveyed by the conveying unit 4.

In addition, the print heads 30 each include a pressure chamber 30B (see FIG. 3), a piezoelectric element 30C (see FIG. 3), and an individual flow path 30D (see FIG. 3) corresponding to each of the nozzles 30A. The pressure chamber 30B communicates with the nozzle 30A and contains ink. The piezoelectric element 30C changes the pressure in the pressure chamber 30B in response to an input of a drive signal. The drive signal is an electric signal whose voltage changes over time. Specifically, the piezoelectric element 30C changes the pressure in the pressure chamber 30B by vibrating the wall surface of the pressure chamber 30B in response to an input of the drive signal. For example, the piezoelectric element 30C causes the nozzle 30A to eject ink in response to an input of a predetermined drive signal for ejection. The individual flow path 30D is an ink flow path provided between the pressure chamber 30B and a common flow path (not shown) common to the plurality of nozzles 30A. A plurality of individual flow paths 30D corresponding to the plurality of nozzles 30A are connected to the common flow path. The common flow path is connected to an ink supply portion (not shown) that supplies ink to each pressure chamber 30B.

In addition, the print heads 30 each include a drive circuit 30E (see FIG. 4) corresponding to each piezoelectric element 30C. The drive circuit 30E drives the piezoelectric element 30C based on data input from the second control portion 8. Specifically, the drive circuit 30E generates the drive signal based on data input from the second control portion 8, and inputs the generated drive signal to the piezoelectric element 30C.

In the present embodiment, the line head 31 has three print heads 30 arranged in a staggered manner along the width direction D12. Similarly to the line head 31, each of the other line heads 32 to 34 also has three print heads 30 arranged in a staggered manner along the width direction D12. It is noted that FIG. 2 shows the image forming portion 3 as viewed from the top of FIG. 1.

The head frame 35 supports the line heads 31 to 34. The head frame 35 is supported by the housing 1. It is noted that the number of line heads included in the image forming portion 3 may be any number including one. In addition, the number of print heads 30 provided in each of the line heads 31 to 34 may be any number.

As shown in FIG. 1, the conveying unit 4 is disposed below the line heads 31 to 34. The conveying unit 4 conveys the sheet while having the sheet face the print heads 30. For example, each time the print heads 30 eject ink, the conveying unit 4 conveys the sheet by a predetermined conveying amount. In addition, the conveying unit 4 stops conveying the sheet while the print heads 30 are ejecting ink. As shown in FIG. 1, the conveying unit 4 includes a conveying belt 41 on which the sheet is placed, a first tension roller 42, a second tension roller 43, and a third tension roller 44 which tension the conveying belt 41, and a conveying frame 45 that supports them. It is noted that the gap between the conveying belt 41 and the print heads 30 is adjusted so that the gap between the surface of the sheet and the print heads 30 during image formation is a predetermined distance (for example, 1 mm).

The first tension roller 42 is driven to rotate by rotational drive force supplied by a motor (not shown). Thus, the conveying belt 41 rotates in a direction in which the sheet can be conveyed in the conveying direction D11 (see FIG. 1). It is noted that the conveying unit 4 is also provided with a suction unit (not shown) that sucks air from a large number of through holes formed in the conveying belt 41 in order to attract the sheet to the conveying belt 41. In addition, a pressure roller 46 is provided above the first tension roller 42 to convey the sheet while pressing the sheet against the conveying belt 41.

The operation display portion 5 includes a display portion such as a liquid crystal display that displays various types of information in response to a control instruction from the first control portion 7, and an operation portion such as operation keys or a touch panel that inputs various types of information to the first control portion 7 in response to a user's operation. The operation display portion 5 is provided on the upper surface of the housing 1.

The storage portion 6 is a nonvolatile storage device. For example, the storage portion 6 is a nonvolatile memory such as a flash memory.

Figure 4:
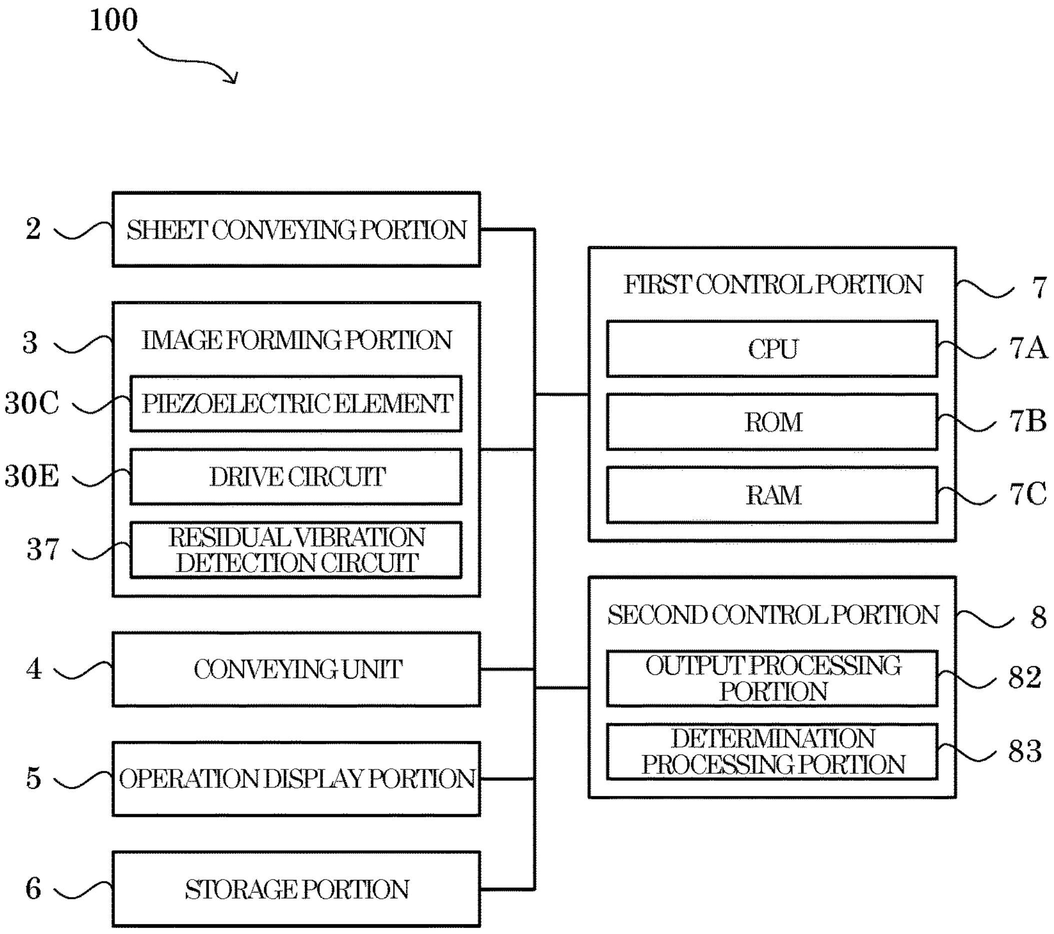
FIG. 4 is a block diagram showing a system configuration of the image forming apparatus according to the embodiment of the present disclosure.

The first control portion 7 performs overall control of the image forming apparatus 100. As shown in FIG. 4, the first control portion 7 includes a CPU 7A, a ROM 7B, and a RAM 7C. The CPU 7A is a processor that executes various types of arithmetic processing. The ROM 7B is a nonvolatile storage device in which information such as control programs for causing the CPU 7A to execute various types of processing are stored in advance. The RAM 7C is a volatile or nonvolatile storage device used as a temporary storage memory (work area) for various types of processing executed by the CPU 7A. The CPU 7A performs overall control of the image forming apparatus 100 by executing various control programs stored in the ROM 7B in advance.

The first control portion 7 inputs the image data to the second control portion 8 when image formation processing for forming an image based on the image data is executed.

The second control portion 8 controls the image forming portion 3 based on the image data input from the first control portion 7. For example, the second control portion 8 is constituted by an electronic circuit such as an integrated circuit (ASIC, DSP).

Specifically, the second control portion 8 executes conversion processing for converting each item of pixel data included in the image data into one of ejection pixel data used for ejection of ink from the nozzle 30A corresponding to the item of pixel data and non-ejection pixel data used for non-ejection of ink from the nozzle 30A corresponding to the item of pixel data.

Here, the ejection pixel data is data used to generate the drive signal for ejection. In addition, the non-ejection pixel data is data corresponding to a non-input state of the drive signal to the piezoelectric element 30C.

The second control portion 8 inputs the ejection pixel data or non-ejection pixel data obtained by the conversion processing to the corresponding drive circuit 30E. In the drive circuit 30E, the drive signal for ejection is generated in response to the input of the ejection pixel data. When the non-ejection pixel data is input, the drive signal is not generated in the drive circuit 30E.

By the way, when the image forming apparatus 100 is used for the first time or the like, filling processing for filling the empty pressure chamber 30B with ink using the ink supply portion may be executed. Here, if the end timing of the filling processing can be determined based on the timing at which the filling of the pressure chamber 30B with ink has been completed, it is possible to suppress the unnecessary continuation of the filling processing. However, conventional image forming apparatuses do not have a function of determining whether or not the filling of the pressure chamber 30B with the ink has been completed.

In contrast, the image forming apparatus 100 according to the embodiment of the present disclosure can determine whether or not the filling of the pressure chamber 30B with ink has been completed, as will be described below.

Specifically, the print heads 30 each include a residual vibration detection circuit 37 (see FIG. 4) corresponding to the piezoelectric element 30C.

[Configuration of Residual Vibration Detection Circuit 37]

Figure 5:
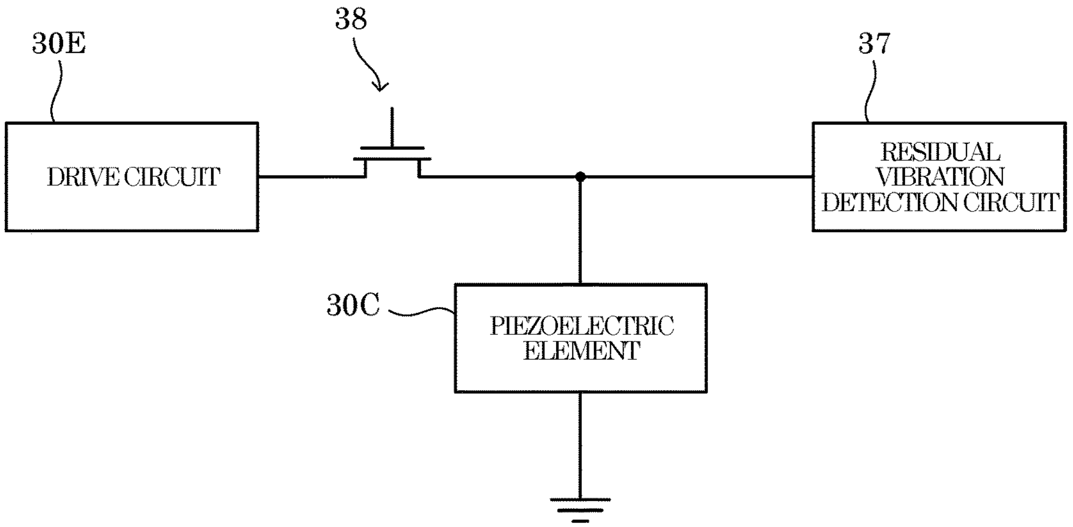
FIG. 5 is a diagram showing a connection state of a residual vibration detection circuit of the image forming apparatus according to the embodiment of the present disclosure.
Figure 6:
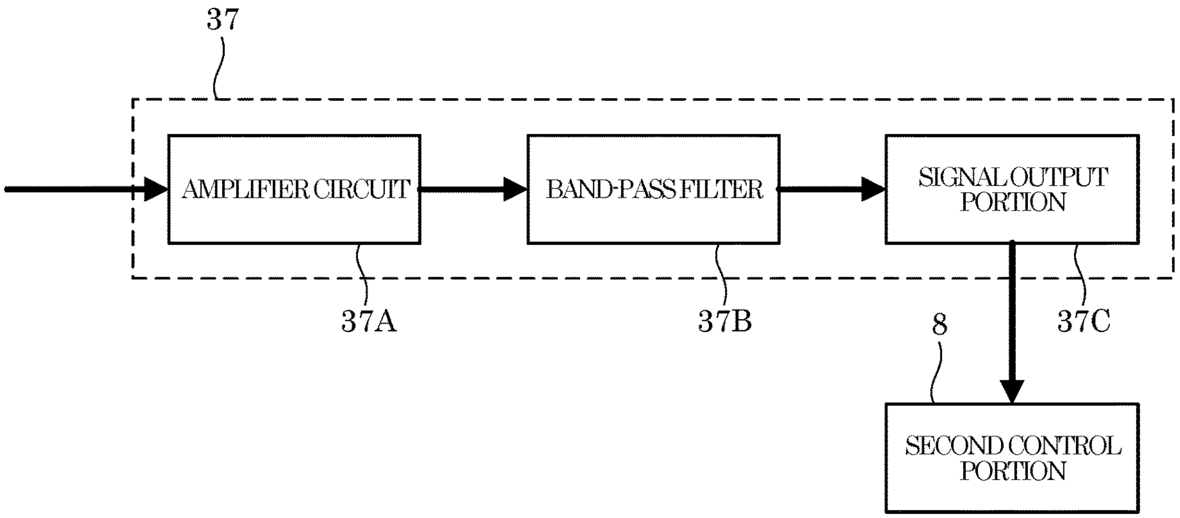
FIG. 6 is a diagram showing a configuration of the residual vibration detection circuit of the image forming apparatus according to the embodiment of the present disclosure.
Figure 7:
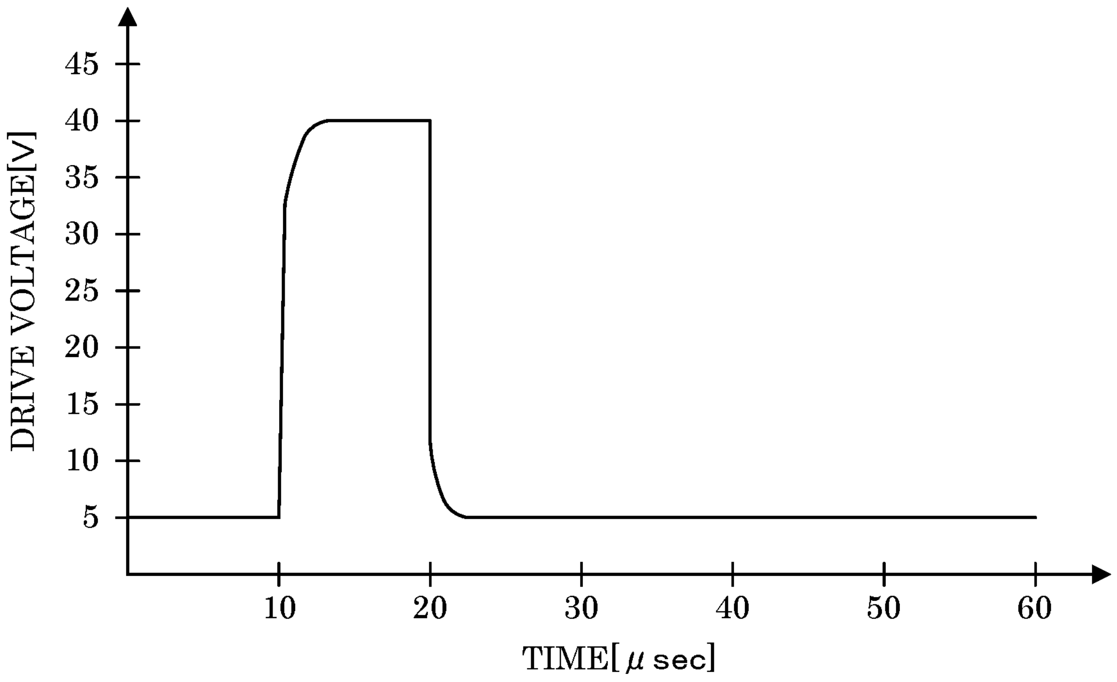
FIG. 7 is a diagram showing an example of a drive signal for detection input to a piezoelectric element of the image forming apparatus according to the embodiment of the present disclosure.

Next, a configuration of the residual vibration detection circuit 37 will be described with reference to FIG. 5 to FIG. 7. Here, FIG. 5 is a block diagram showing a connection state of the residual vibration detection circuit 37. In addition, FIG. 6 is a block diagram showing a configuration of the residual vibration detection circuit 37. It is noted that, in FIG. 6, the flow of the electric signal from the piezoelectric element 30C to the second control portion 8 is indicated by thick lines with arrows.

The residual vibration detection circuit 37 detects residual vibration generated in the pressure chamber 30B in response to an input of a predetermined drive signal for detection (see FIG. 7) to the piezoelectric element 30C.

Here, the drive signal for detection is a signal capable of generating vibration in the pressure chamber 30B and incapable of causing the nozzle 30A to eject ink. The drive signal for detection is desirably determined so that the vibration generated in the pressure chamber 30B is as large as possible. For example, as shown in FIG. 7, the drive signal for detection is a signal having a single push-pull drive pulse waveform. The drive circuit 30E generates the drive signal for detection in response to an input of predetermined detection pixel data from the second control portion 8, and outputs the generated drive signal for detection. It is noted that the drive signal for detection may be a signal having a pull-push drive pulse waveform.

Specifically, the residual vibration detection circuit 37 outputs a pulse signal every time a first electric signal corresponding to the residual vibration output from the piezoelectric element 30C exceeds a predetermined threshold value.

As shown in FIG. 5, the residual vibration detection circuit 37 is electrically connected between the drive circuit 30E and the piezoelectric element 30C on an energizing path from the drive circuit 30E to the ground via the piezoelectric element 30C. A switch 38, such as an analog switch, is provided between the drive circuit 30E and a connection portion of the energizing path to the residual vibration detection circuit 37. The switch 38 is turned on when the drive signal is input from the drive circuit 30E to the piezoelectric element 30C. In addition, the switch 38 is switched from the ON state to the OFF state after the input of the drive signal for detection from the drive circuit 30E to the piezoelectric element 30C. Thus, the first electric signal output from the piezoelectric element 30C in response to the input of the drive signal for detection is input to the residual vibration detection circuit 37.

As shown in FIG. 6, the residual vibration detection circuit 37 includes an amplifier circuit 37A, a band-pass filter 37B, and a signal output portion 37C.

The amplifier circuit 37A amplifies the first electric signal corresponding to the residual vibration output from the piezoelectric element 30C at a predetermined amplification ratio.

When the pressure chamber 30B is in a filled state in which the pressure chamber 30B is filled with ink, the first electric signal has a frequency in the 100 kilohertz band. When the pressure chamber 30B is not in the filled state, the first electric signal has a frequency in the several megahertz band.

In response to an input of the amplified first electric signal output from the amplifier circuit 37A, the band-pass filter 37B outputs a second electric signal obtained by removing frequency components not included in a predetermined specific frequency band from the first electric signal.

Here, the specific frequency band is a frequency band including the frequency of the first electric signal when the pressure chamber 30B is in the filled state. That is, the specific frequency band is a 100 kilohertz band. It is noted that the frequency of the first electric signal when the pressure chamber 30B is in the filled state varies depending on the structure of the pressure chamber 30B, the property of the ink, the performance of the piezoelectric element 30C, and the like. Therefore, the specific frequency band need not be limited to the 100 kilohertz band.

The signal output portion 37C outputs a pulse signal when the second electric signal input from the band-pass filter 37B exceeds the threshold value. For example, the signal output portion 37C is a comparator including a first input terminal connected to an output terminal of the band-pass filter 37B, a second input terminal to which a voltage corresponding to the threshold value is input, and an output terminal. It is noted that the threshold value may be determined based on the amplitude of the first electric signal when the pressure chamber 30B is in the filled state.

The pulse signal output from the signal output portion 37C is input to the second control portion 8.

It is noted that the residual vibration detection circuit 37 may include an AC coupling capacitor that removes a DC component from the first electric signal input to the amplifier circuit 37A. This makes it possible to remove the unnecessary DC component when the residual vibration is offset.

[Configuration of Second Control Portion 8]

Next, a configuration of the second control portion 8 will be described with reference to FIG. 4.

As shown in FIG. 4, the second control portion 8 includes an output processing portion 82 and a determination processing portion 83.

It is noted that the output processing portion 82 and the determination processing portion 83 may be provided in the first control portion 7. Specifically, the CPU 7A of the first control portion 7 may function as the output processing portion 82 and the determination processing portion 83 by executing the control programs stored in advance in the ROM 7B. In this case, the image forming apparatus 100 does not have to include the second control portion 8.

The output processing portion 82 causes the piezoelectric element 30C to output the first electric signal corresponding to the residual vibration (an example of the vibration of the present disclosure) generated in the pressure chamber 30B in response to an input of the drive signal for detection (an example of the drive signal of the present disclosure) to the piezoelectric element 30C.

For example, the output processing portion 82 inputs the detection pixel data to the drive circuit 30E. Thus, the drive signal for detection is output from the drive circuit 30E, and input to the piezoelectric element 30C. In addition, the output processing portion 82 switches the switch 38 from the ON state to the OFF state after the drive signal for detection is input to the piezoelectric element 30C. Thus, the first electric signal output from the piezoelectric element 30C in response to the input of the drive signal for detection is input to the residual vibration detection circuit 37.

The determination processing portion 83 determines whether or not the pressure chamber 30B is in the filled state based on whether or not a pulse signal is output from the signal output portion 37C.

Specifically, when a pulse signal is output from the signal output portion 37C, the determination processing portion 83 determines that the pressure chamber 30B is in the filled state. When a pulse signal is not output from the signal output portion 37C, the determination processing portion 83 determines that the pressure chamber 30B is not in the filled state.

It is noted that the determination processing portion 83 may determine whether or not the pressure chamber 30B is in the filled state based on whether or not there is a change in the second electric signal output from the band-pass filter 37B. In this case, the residual vibration detection circuit 37 does not have to include the signal output portion 37C.

In addition, the determination processing portion 83 may determine whether or not the pressure chamber 30B is in the filled state based on the frequency of the first electric signal output by the output processing portion 82. In this case, the residual vibration detection circuit 37 does not have to include the band-pass filter 37B and the signal output portion 37C.

[Filling State Determination Processing]

Figure 8:
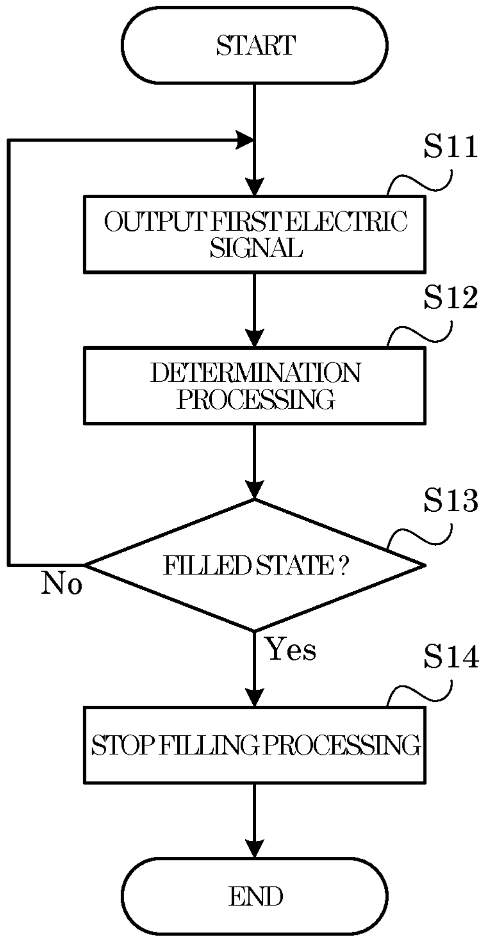
FIG. 8 is a flowchart showing an example of filling state determination processing executed in the image forming apparatus according to the embodiment of the present disclosure.

The determination method of the present disclosure will be described with reference to FIG. 8, along with an example of the procedure of filling state determination processing executed by the second control portion 8 in the image forming apparatus 100. Here, steps S11, S12, . . . represent the numbers of the processing procedure (steps) executed by the second control portion 8. It is noted that the filling state determination processing is executed together with the filling processing when the filling processing is executed.

<Step S11>

First, in step S11, the second control portion 8 causes the piezoelectric element 30C to output the first electric signal. Here, the process of step S11 is executed by the output processing portion 82 of the second control portion 8. The process of step S11 is an example of the output step of the present disclosure.

Specifically, the second control portion 8 inputs the detection pixel data to the drive circuit 30E. Thus, the drive signal for detection is output from the drive circuit 30E, and input to the piezoelectric element 30C. In addition, the second control portion 8 switches the switch 38 from the ON state to the OFF state after the drive signal for detection is input to the piezoelectric element 30C. Thus, the first electric signal output from the piezoelectric element 30C in response to the input of the drive signal for detection is input to the residual vibration detection circuit 37.

<Step S12>

In step S12, the second control portion 8 executes determination processing for determining whether or not the pressure chamber 30B is in the filled state based on whether or not a pulse signal is output from the signal output portion 37C. Here, the process of step S12 is executed by the determination processing portion 83 of the second control portion 8. The process of step S12 is an example of the determination step of the present disclosure.

Specifically, the second control portion 8 determines that the pressure chamber 30B is in the filled state when a pulse signal is output from the signal output portion 37C. When a pulse signal is not output from the signal output portion 37C, the second control portion 8 determines that the pressure chamber 30B is not in the filled state.

<Step S13>

In step S13, the second control portion 8 switches the subsequent process according to the result of the process of step S12. Specifically, when it is determined that the pressure chamber 30B is in the filled state (Yes in S13), the second control portion 8 shifts the processing to step S14. In addition, when it is determined that the pressure chamber 30B is not in the filled state (No in S13), the second control portion 8 shifts the processing to step S11. Thus, the processing from step S11 to step S13 is repeatedly executed until it is determined that the pressure chamber 30B is in the filled state.

<Step S14>

In step S14, the second control portion 8 stops the filling processing being executed. It is noted that the second control portion 8 may stop the filling processing at the timing when it is determined that the pressure chamber 30B is in the filled state, or may stop the filling processing after a predetermined time has elapsed from the timing when it is determined that the pressure chamber 30B is in the filled state.

In this manner, in the image forming apparatus 100, the piezoelectric element 30C outputs the first electric signal corresponding to the vibration generated in the pressure chamber 30B in response to an input of the drive signal for detection to the piezoelectric element 30C. Then, based on the frequency of the output first electric signal, it is determined whether or not the pressure chamber 30B is in the filled state. That is, in the image forming apparatus 100, it is possible to determine whether or not the filling of the pressure chamber 30B with ink has been completed.

It is noted that the drive signal for detection may be a signal capable of causing the nozzle 30A to eject ink.

In addition, the liquid of the present disclosure need not be limited to ink.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A liquid ejection apparatus comprising:

a nozzle configured to eject a liquid;

a pressure chamber communicating with the nozzle and configured to contain the liquid;

a piezoelectric element configured to change a pressure in the pressure chamber in response to an input of a drive signal;

an output processing portion configured to cause the piezoelectric element to output a first electric signal corresponding to vibration generated in the pressure chamber in response to the input of the drive signal to the piezoelectric element;

a determination processing portion configured to determine whether or not the pressure chamber is in a filled state in which the pressure chamber is filled with the liquid, based on a frequency of the first electric signal output by the output processing portion;

a band-pass filter configured to output a second electric signal obtained by removing a frequency component not included in a predetermined specific frequency band from the first electric signal in response to an input of the first electric signal; and a comparator configured to output a pulse signal when the second electric signal exceeds a predetermined threshold value, wherein the predetermined specific frequency band is a frequency band including a frequency of the first electric signal when the pressure chamber is in the filled state and not including a frequency of the first electric signal when the pressure chamber is not in the filled state, and the comparator outputs the pulse signal to the determination processing portion when the second electric signal changes.

* * * * *